3,475,414
TETRAHYDRO-1-BENZAZEPIN-2(1H)-ONE
DERIVATIVES

Herbert John Havera, Elkhart, Ind., assignor to Miles Laboratories, Inc., Elkhart, Ind., a corporation of Indiana
No Drawing. Filed Dec. 5, 1966, Ser. No. 598,909
Int. Cl. C07d 41/08; A61k 27/00
U.S. Cl. 260—239.3           4 Claims

ABSTRACT OF THE DISCLOSURE

A series of 1-substituted derivatives of 2,3,4,5-tetrahydro-1-benzazepin-2(1H)-one in which the substituent at the 1-position is an amino-alkyl radical have been found to have analgetic activity.

---

This invention relates to a series of novel 2,3,4,5-tetrahydro-1-benzazepin-2(1H)-one drivatives having pharmacological activity.

The compounds of this invention have the following formula:

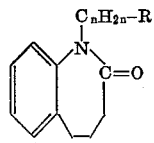

where $n$ is 2 or 3 and R is a tertiary amino radical such as:

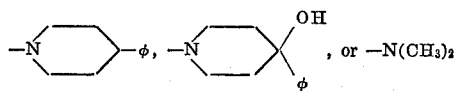

These compounds can be conveniently prepared by reacting a metal derivative of 2,3,4,5-tetrahydro-1-benzazepinone with a suitable aminoalkyl halide. The metal derivative of the tetrahydrobenzazepinone is conveniently prepared by treatment with a reactive metal hydride such as sodium hydride. This process of preparation of these compounds is shown in the following equation:

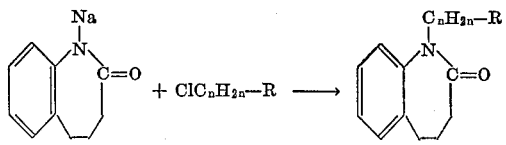

Alternatively, the compounds of this invention can be prepared by reacting the benzazepinone with the aminoalkyl halide in the presence of a suitable basic catalyst such as an alkali metal alkoxide.

These compounds are useful as analgetic agents and can be suitably formulated as unit dosage forms in the conventional manner. They can be used as the free bases or isolated as their pharmacologically acceptable acid addition salts.

This invention is illustrated in the following examples:

EXAMPLE I

1-[2-(4-hydroxy-4-phenyl-1-piperidyl)ethyl]-2,3,4,5-tetrahydro-1-benzazepin-2(1H)-one oxalate monohydrate.—To 10.0 g. (0.062 mole) of 2,3,4,5-tetrahydro-1-benzazepin-2(1H)-one in 100 ml. of dry xylene was added 4.0 g. of sodium hydride carefully with stirring. The solution was then heated slowly to reflux while stirring and the mixture was refluxed for 4 hours to assure formation of the sodium salt. The solution was then cooled and another 4.0 g. of sodium hydride was added. To the solution was added 19.2 g. (0.06 mole) of 4-phenyl-4-hydroxy-1(2-chloroethyl)piperidine hydrobromide in 50 ml. of xylene. The mixture was heated slowly during the addition. After the addition was complete, the reaction mixture was refluxed with stirring for 4 more hours. The solution was cooled and water was added to dissolve the inorganic material. Chloroform was also added to the solution and the organic layer was removed, washed with water and dried over magnesium sulfate. The chloroform and xylene were then concentrated in vacuo leaving an oily residue.

Yield 25.0 g., $\nu_{max.}^{CHCl_3}$ 1665 cm.$^{-1}$ (amide carbonyl)

3600 cm.$^{-1}$ (free-OH).

The oxalate was prepared by adding 6.12 g. (0.068 mole) of oxalic acid to the free base in methanol. An oil formed which crystallized on scratching. The tan solid was filtered and recrystallized from methanol and water.

Yield 6.0 g., M.P. 117–119°.

Analysis.—Calcd. for $C_{25}H_{32}N_2O_7$: C, 63.55; H, 6.83; N, 5.93. Found: C, 63.93; H, 6.79; N, 5.99.

EXAMPLE II

1-[3-(4-phenyl-1-piperidyl)propyl]-2,3,4,5-tetrahydro-1-benzazepin-2(1H)-one.—To 10.0 g. (0.06 mole) of 2,3,4,5-tetrahydro-1-benzazepin-2(1H)-one in 100 ml of xylene was added 4.0 g. of sodium hydride carefully with stirring. The mixture was then heated to reflux for 4 hours to assure formation of the sodium salt. The mixture was cooled and 14.5 g. (0.06 mole) of 1-(3-chloropropyl)-4-phenylpiperidine was added in 50 ml. of xylene and the reaction mixture was refluxed with stirring for an additional 4 hours. The solution was cooled and water was added to dissolve the inorganic material. Chloroform was also added and the organic layer was removed, washed with water, and dried over magnesium sulfate. The chloroform was removed in vacuo leaving an oily residue.

$\nu_{max.}^{CHCl_3}$ 1650 cm.$^{-1}$ (amide carbonyl)

The material was distilled and a fraction boiling at 220–222° at .3 mm. was collected.

Yield 16.5 g.

Analysis.—Calcd. for $C_{24}H_{30}N_2O$: C, 79.51; H, 8.34; N, 7.73. Found: C, 79.51; H, 8.23; N, 7.75.

EXAMPLE III 1-(3-dimethylaminopropyl)-2,3,4,5-tetrahydro-1-benzazepin-2(1H)-one oxalate.—To 10.0 g. (0.06 mole) of 2,3,4,5-tetrahydro-1-benzazepin-2(1H)-one in a steel bomb was added 100 ml. dry benzene, 10.0 g. (0.06 mole) of 3-chloro-N,N-dimethylpropylamine hydrochloride and 7.0 g. (0.12 mole) of sodium methoxide. The mixture was then heated for 4 hours at 110–115° in the steel bomb. The solution was cooled and water and chloroform were added. The chloroform layer was removed and dried over magnesium sulfate. The organic solvents were concentrated in vacuo leaving an oil which was distilled under vacuum. A fraction boiling at 135–145° at .3 mm. was collected.

Yield 10.0 g., $\nu_{max.}^{CHCl_3}$ 1650 cm.$^{-1}$ (amide carbonyl)

The oxalate salt was prepared by adding 3.6 g. (0.04 mole) of oxalic acid to 10.0 g. (0.04 mole) of the free base in methanol. The solution was warmed on the steam bath for 5 minutes and anhydrous ether was added. A solid immediately precipitated which was recrystallized from a methanol and ether mixture.

Yield 5.5 g., M.P. 165–166.5°.

Analysis.—Calcd. for $C_{17}H_{24}N_2O_5$: C, 60.70; H, 7.19; N, 8.33. Found: C, 60.17; H, 7.25; N, 8.22.

EXAMPLE IV

1-[2-(4-phenyl-1-piperidyl)ethyl] - 2,3,4,5 - tetrahydro-1-benzazepin - 2(1H) - one hydrochloride.—To 20.0 g. (0.125 mole) of 2,3,4,5-tetrahydro-1-benzazepin-2(1H)-one in 100 ml. of dry xylene was added carefully with stirring 7.0 g. of sodium hydride under nitrogen. The solution was then refluxed with stirring for 3 hours. The mixture was cooled and an additional 7.0 g. of sodium hydride was added. To the solution was then added 33.8 g. (0.13 mole) of 4-phenyl-1-(2-chloroethyl)piperidine hydrochloride. The mixture was then refluxed with stirring for 3 more hours. To the cooled reaction mixture was added a mixture of water and chloroform. The organic layer was removed, washed with water and then dried over magnesium sulfate. The organic solvents were concentrated in vacuo leaving a dark oil which was distilled under vacuum. A fraction boiling at 212–215° at .2 mm. was collected.

Yield 22.0 g., $\nu_{max.}^{CHCl_3}$ 1650 cm.$^{-1}$ (amide carbonyl)

To 17.0 g. (0.05 mole) of the free base in methanol was added 26 ml. of a 1.89 N HCl solution in isopropanol. Upon addition of ether, a white solid formed which was recrystallized from a methanol and ether mixture.

Yield 11 g., M.P. 228–229°.

*Analysis.*—Calcd. for $C_{23}H_{29}ClN_2O$: C, 71.75; H, 7.60; N, 7.29. Found: C, 71.59; H, 7.57; N, 7.28.

In summary, this invention provides a series of 1-substituted derivatives of 2,3,4,5-tetrahydro-1-benzazepin-2(1H)-one which are useful as analgetic agents.

What is claimed is:
1. A compound of the formula

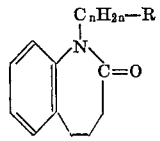

where $n$ is 2 or 3 and R is

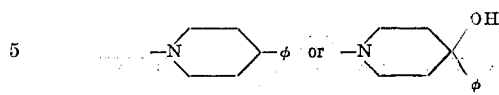

or a pharmacologically acceptable acid addition salt thereof.

2. A compound according to claim 1 which is 1-[2-(4-hydroxy-4-phenyl - 1 - piperidyl)ethyl] - 2,3,4,5 - tetrahydro-1-benzazepin-2(1H)-one.

3. A compound according to claim 1 which is 1-[3-(4-phenyl - 1 - piperidyl)propyl] - 2,3,4,5 - tetrahydro - 1-benzazepin-2(1H)-one.

4. A compound according to claim 1 which is 1-[2-(4-phenyl - 1 - piperidyl)ethyl] - 2,3,4,5 - tetrahydro - 1-benzazepin-2(1H)-one.

References Cited
UNITED STATES PATENTS 3,326,900   6/1967   Schmidt _____ 260—239.3

FOREIGN PATENTS 6,514,240   5/1966   Netherlands.

OTHER REFERENCES

Evans et al.: J. Chem. Soc. (1965), pages 4806–4812 (September).

HENRY R. JILES, Primary Examiner

R. T. BOND, Assistant Examiner

U.S. Cl. X.R.

424—244, 267